(12) United States Patent
Taylor

(10) Patent No.: US 7,699,323 B2
(45) Date of Patent: Apr. 20, 2010

(54) ICEBOARD

(76) Inventor: Martin Phillip Taylor, 9120 Leaside Dr., Dallas, TX (US) 75238

( * ) Notice: Subject to any disclaimer, the term of this patent is extended or adjusted under 35 U.S.C. 154(b) by 187 days.

(21) Appl. No.: 11/859,007

(22) Filed: Sep. 21, 2007

(65) Prior Publication Data

US 2009/0079149 A1    Mar. 26, 2009

(51) Int. Cl.
*B62B 9/04* (2006.01)
(52) U.S. Cl. ............... 280/14.21; 280/14.22; 280/14.27
(58) Field of Classification Search ............. 280/14.21, 280/14.26, 14.27, 14.28, 20, 87.041, 87.042, 280/604, 606, 809, 811, 813, 816
See application file for complete search history.

(56) References Cited

U.S. PATENT DOCUMENTS

| | | | |
|---|---|---|---|
| 4,043,566 A * | 8/1977 | Johnson ................. 280/87.042 |
| 4,320,905 A * | 3/1982 | Andrew et al. ........... 280/14.21 |
| 4,896,893 A * | 1/1990 | Shumays et al. ......... 280/14.21 |
| 5,553,403 A * | 9/1996 | McManus ..................... 36/124 |
| 6,378,880 B1 * | 4/2002 | Lin .......................... 280/87.05 |
| 6,870,139 B2 * | 3/2005 | Petrenko ..................... 219/482 |
| 7,059,623 B1 * | 6/2006 | Yeh ............................. 280/605 |
| 2002/0043775 A1 * | 4/2002 | Baldwin .................. 280/14.21 |
| 2002/0121757 A1 * | 9/2002 | Louh ..................... 280/87.041 |
| 2003/0173769 A1 * | 9/2003 | Clausing ..................... 280/809 |
| 2004/0007838 A1 * | 1/2004 | Farmer ..................... 280/14.27 |

* cited by examiner

*Primary Examiner*—Paul N Dickson
*Assistant Examiner*—Brodie Follman
(74) *Attorney, Agent, or Firm*—Baker Botts L.L.P.

(57) ABSTRACT

In one embodiment, an iceboard includes a plank having a first end and a second end and a first side and a second side. One or more supports are coupled to the first side of the plank and, one or more blades are coupled to the one or more supports, the blades operable to glide across an icy surface. The iceboard further includes a piece of frictional material coupled to the second side of the plank and operable to provide traction relative to the plank. The iceboard further includes a brake coupled to the first side of the plank adjacent a first end of the plank. In particular embodiments, the brake is operable to abrasively scrape the icy surface when applied to the icy surface.

18 Claims, 2 Drawing Sheets

ICEBOARD

TECHNICAL FIELD

The present disclosure relates generally to recreational devices and more particularly to an iceboard.

BACKGROUND

People engage in recreational activities at all times of the year in all kinds of climates. Consequently, people desire devices that will enable them to use their surroundings for recreational purposes. For example, people may use water skis to traverse expanses of water, or snow skis to traverse expanses of snow. Additionally, people often seek out new forms of sports activities leading to the development of new and different recreational devices.

DESCRIPTION OF EXAMPLE EMBODIMENTS

Overview

In one embodiment, an iceboard includes a plank having a first end and a second end and a first side and a second side. One or more supports are coupled to the first side of the plank, and one or more blades are coupled to the one or more supports, the blades operable to glide across an icy surface. The iceboard further includes a piece of frictional material coupled to the second side of the plank and operable to provide traction relative to the plank. The iceboard further includes a brake coupled to the first side of the plank adjacent a first end of the plank. In particular embodiments, the brake is operable to abrasively scrape the icy surface when applied to the icy surface.

Description

Figure 1:
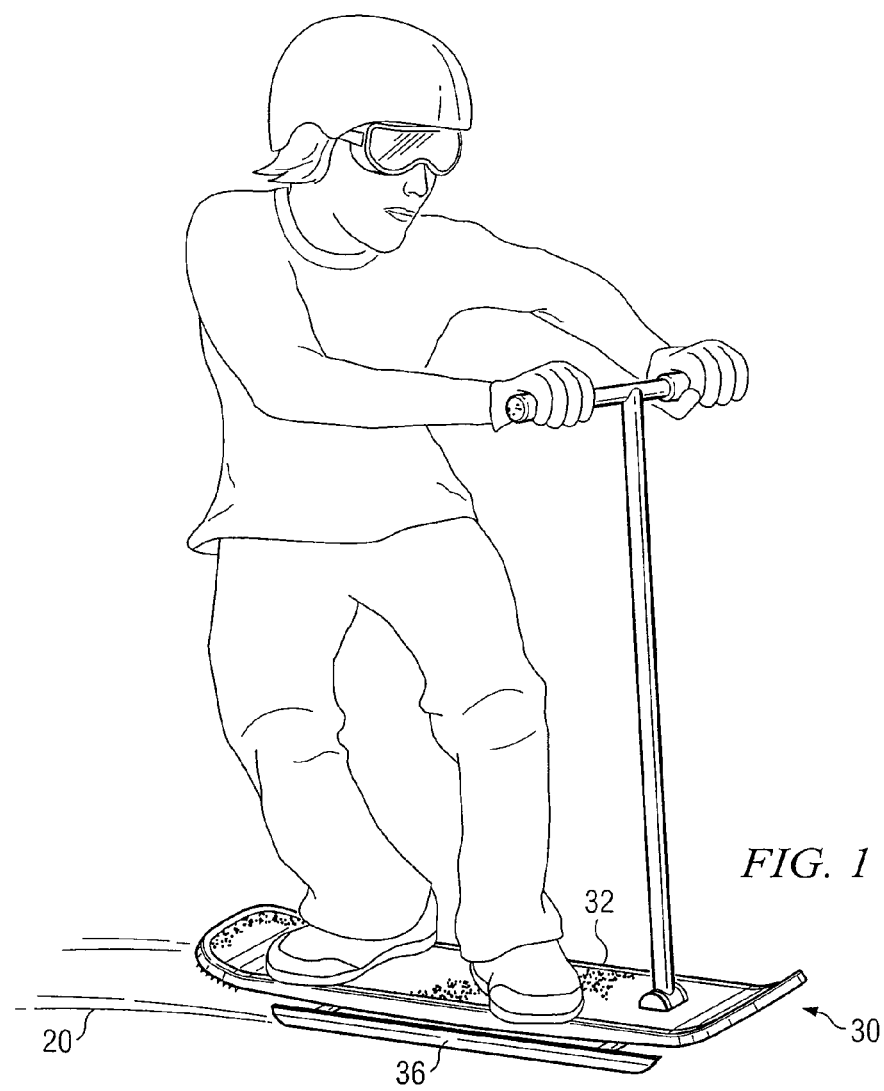
FIG. 1 illustrates an example view of a rider on an embodiment of an iceboard.

FIG. 1 illustrates an example view of a rider on an iceboard 30 traversing an icy surface 20. In particular embodiments, iceboard 30 glides across icy surface 20 using one or more blades 36. As an example and not by way of limitation, when a rider of iceboard 30 steps onto iceboard 30, the weight of the rider may be transmitted to icy surface 20 through blades 36. By transmitting the rider's weight to icy surface 20, blades 36 exert pressure on icy surface 20 thereby lowering the freezing point of the portion of icy surface 20 residing directly beneath blades 36. Lowering the freezing point of icy surface 20 beneath blades 36 may create a thin layer of liquid water between blades 36 and icy surface 20. Iceboard 30 may glide across icy surface 20 on this thin layer of water beneath blades 36.

Recreational devices such as iceboard 30 may be used by one or more riders for a number of purposes. As an example and not by way of limitation, iceboard 30 may be used for transporting a rider or riders across an icy surface or may be used for performing tricks or stunts while on an icy surface. By pushing against icy surface 20, a rider of iceboard 30 may propel iceboard 30 across icy surface 20. As an example and not by way of limitation, a rider of iceboard 30 may push against icy surface 20 by kicking against icy surface 20 or by pushing against icy surface 20 with a pole or other rigid instrument. One of ordinary skill in the art will appreciate that the above-described uses of iceboard 30 were presented for the sake of explanatory simplicity and will further appreciate that the present disclosure contemplates any suitable use of iceboard 30.

Figure 2:
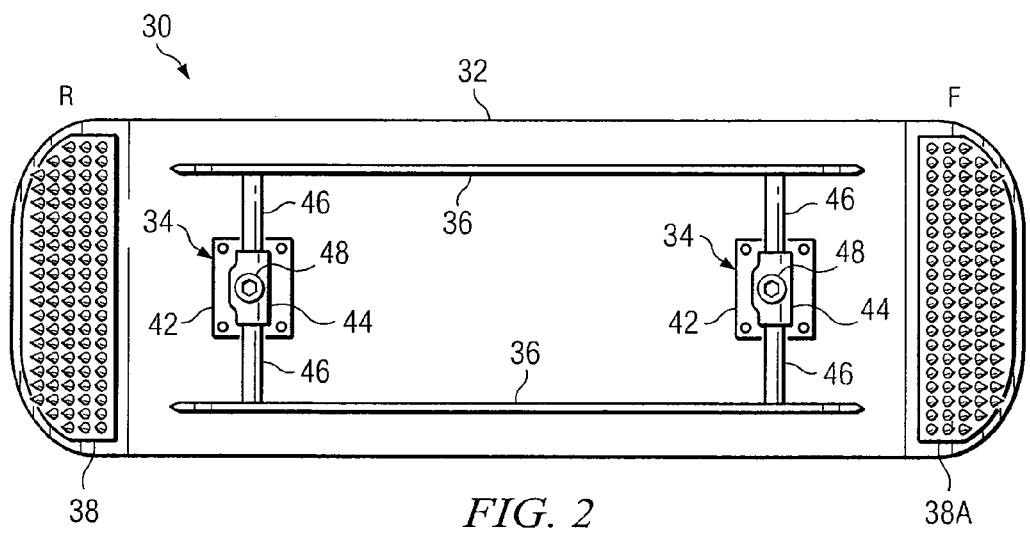
FIG. 2 is an underside view of an iceboard.

FIG. 2 illustrates an underside view of an example embodiment of an iceboard 30. Iceboard 30 includes a plank 32 coupled to one or more blades 36 via one or more supports 34. Additionally, iceboard 30 includes a brake 38 disposed adjacent to the rear of plank 32.

For explanatory purposes, the front of iceboard 30 as depicted in FIG. 2 has been labeled with an "F" and the rear of iceboard 30 has been labeled with an "R". One of ordinary skill in the art will appreciate that terms of relativity (e.g., front, rear, top, bottom) are used to depict certain components of iceboard 30 with reference to an example situation where a rider stands on iceboard 30—the top portion being those closest to the soles of the rider's feet, the bottom portion being those closest to the ground, and the front and back portions being those disposed in front of the rider's body or in back of the rider's body, respectively. One of ordinary skill in the art will further appreciate that terms of relativity are not meant to limit the configuration of iceboard 30, and are not meant to restrict the placement of one component of iceboard 30 relative to another.

In particular embodiments, plank 32 provides support for a rider of iceboard 30, thereby allowing the rider to remain stationary relative to blades 36 when moving along an icy surface. In particular embodiments, plank 32 may comprise any mechanical device or fixture or combination of two or more such devices or fixtures capable of supporting the weight of a rider of iceboard 30. As an example and not by way of limitation, plank 32 may be a single, rigid member comprised of wood, fiberglass, or other rigid material. In particular embodiments, plank 32 may be angled upwards at one or both ends to facilitate performing tricks or slowing iceboard 30 with brake 38.

Supports 34 couple plank 32 to blades 36. Supports 34 may further include an adjustment mechanism 35 (see FIG. 3) whereby the position of plank 32 may be vertically adjusted relative to blades 36. By including adjustment mechanism 35 in supports 34, such that the position of plank 32 may be adjusted relative to blades 36, a user of iceboard 30 may elevate plank 32 above the icy surface to avoid becoming mired in, for example, snow that has accumulated on the icy surface. In particular embodiments, supports 34 may aid blades 36 in turning iceboard 30. In particular embodiments, the underside of iceboard 30 may include two supports 34, one support adjacent to the rear end of plank 32 and the other support adjacent to the front end of plank 32. In particular embodiments, iceboard 30 may include three or more supports, the first support and second support respectively disposed adjacent the first end and second end of the underside of plank 32, and the remaining supports being disposed between the first two supports.

As an example and not by way of limitation, supports 34 may be trucks comprising a baseplate 42 and a hanger 44. In particular embodiments, baseplate 42 may be coupled to the underside of plank 32. Hanger 44 may include an axle 46 whereby supports 34 may be coupled to blades 36. In particular embodiments, a cushioning mechanism may be disposed between hanger 44 and baseplate 42. As an example and not by way of limitation, the cushioning mechanism may comprise one or more bushings. These bushings may allow blades 36 to turn when pressure is applied to one side of plank 32. Because iceboard 30 may be operated at sub-freezing temperatures (e.g., below 0 degrees Celsius), the bushings may be composed of a material designed to remain pliant at sub-freezing temperatures. In particular embodiments, baseplate 42, hanger 44, and the cushioning mechanism may be coupled together by a bolt 48.

Blades 36 allow iceboard 30 to move smoothly along an icy surface. In the illustrated embodiment, two blades 36 couple to plank 32 by supports 34. Blades 36 extend parallel to each other for a substantial portion of the length of plank 32. In particular embodiments, blades 36 may be curved at one or both ends to prevent blades 36 from catching on the ice and causing iceboard 30 to stop suddenly. In particular embodiments, iceboard 30 may include four blades 36, each blade 36 being relatively short (e.g., 3 to 6 inches). If iceboard 30 includes four blades 36, two blades 36 may be mounted on either side of a first support 34 affixed adjacent the front of iceboard 30, and two blades 36 may be mounted on either side of a second support 34 affixed adjacent the rear of iceboard 30. As an example and not by way of limitation, blades 36 may be comprised of aluminum, steel, or other hard material. One of ordinary skill in the art will appreciate that the above-described embodiments of blades 36 have been presented for the sake of explanatory simplicity and will further appreciate that the present disclosure contemplates the use of any suitable number and configuration of blades 36, capable of allowing iceboard 30 to glide smoothly across icy surface 20.

Brake 38 may be any mechanical device or fixture or combination of two or more such devices or fixtures capable of abrasively scraping icy surface 20 when drawn along icy surface 20. When brake 38 contacts icy surface 20 over a distance, slidable motion of iceboard 30 relative to the icy surface is inhibited. In particular embodiments, brake 38 may allow a rider of iceboard 30 to slow the speed of iceboard 30 relative to an icy surface by tilting plank 32 to put brake 38 in contact with the icy surface. In particular embodiments, brake 38 may be disposed at the rear of iceboard 30 to allow the rider to slow iceboard 30 by shifting the rider's weight onto the rear portion of plank 32 disposed above brake 38, thereby pushing brake 38 onto the icy surface. As an example and not by way of limitation, brake 38 may be comprised of a plurality of rigid spikes (e.g., metal or plastic) or a sheet of frictional material (e.g., sandpaper) that may be drawn along icy surface 20 to slow iceboard 30. In particular embodiments, a second brake 38A may be disposed adjacent to the underside of the front end of plank 32 to allow a rider to apply second brake 38A to the icy surface by shifting his weight forward. By including a brake at the front and rear of iceboard 30, a rider may slow or stop iceboard 30 by shifting his weight onto the trailing end of iceboard 30, regardless of which end of iceboard 30 is oriented as the front or back. In particular embodiments, brakes 38 and 38A may be removable or interchangeable with another brake 38. As an example and not by way of limitation, a rider of iceboard 30 may desire to couple a first brake 38 having a relatively high coefficient of friction to the first end of iceboard 30 while coupling a second brake 38A having a lower coefficient of friction to the second end of iceboard 30. By coupling brakes 38 and 38A with differing coefficients of friction to either end of iceboard 30, a rider may use each end of iceboard 30 for different purposes (e.g., one end for slowing and one end for stopping). One of ordinary skill in the art will appreciate that the above-described embodiments of brake 38 were presented for the purpose of explanatory simplicity and will further appreciate that the present disclosure contemplates the use of any suitable number and configuration of brake(s) 38 operable to provide frictional interaction between the iceboard 30 and an icy surface when applied to the icy surface.

In particular embodiments, iceboard 30 may include one or more fastening mechanisms (e.g., clips 142 or straps) capable of interlocking with footwear worn by a rider. Additionally, iceboard 30 may be accompanied by specialized footwear to be worn by a rider to provide traction between the rider's foot and an icy surface. As an example and not by way of limitation, the footwear may comprise a shoe removably outfitted with spikes similar to those that may comprise brake 38. As another example and not by way of limitation, the footwear may comprise a shoe including a removable piece of frictional material, such as sandpaper. In particular embodiments, the footwear may comprise shoes that are permanently outfitted with spikes. By including spikes or other frictional material in the footwear, a rider of iceboard 30 may use the footwear to gain traction on the icy surface. One of ordinary skill in the art will appreciate that the above-described embodiment of iceboard 30 was presented for the sake of explanatory simplicity and will further appreciate that the present disclosure contemplates the use of any suitable configuration and number of blades, brakes, planks, and other components of iceboard 30 to create an iceboard on which a rider may traverse and icy surface.

Figure 3:
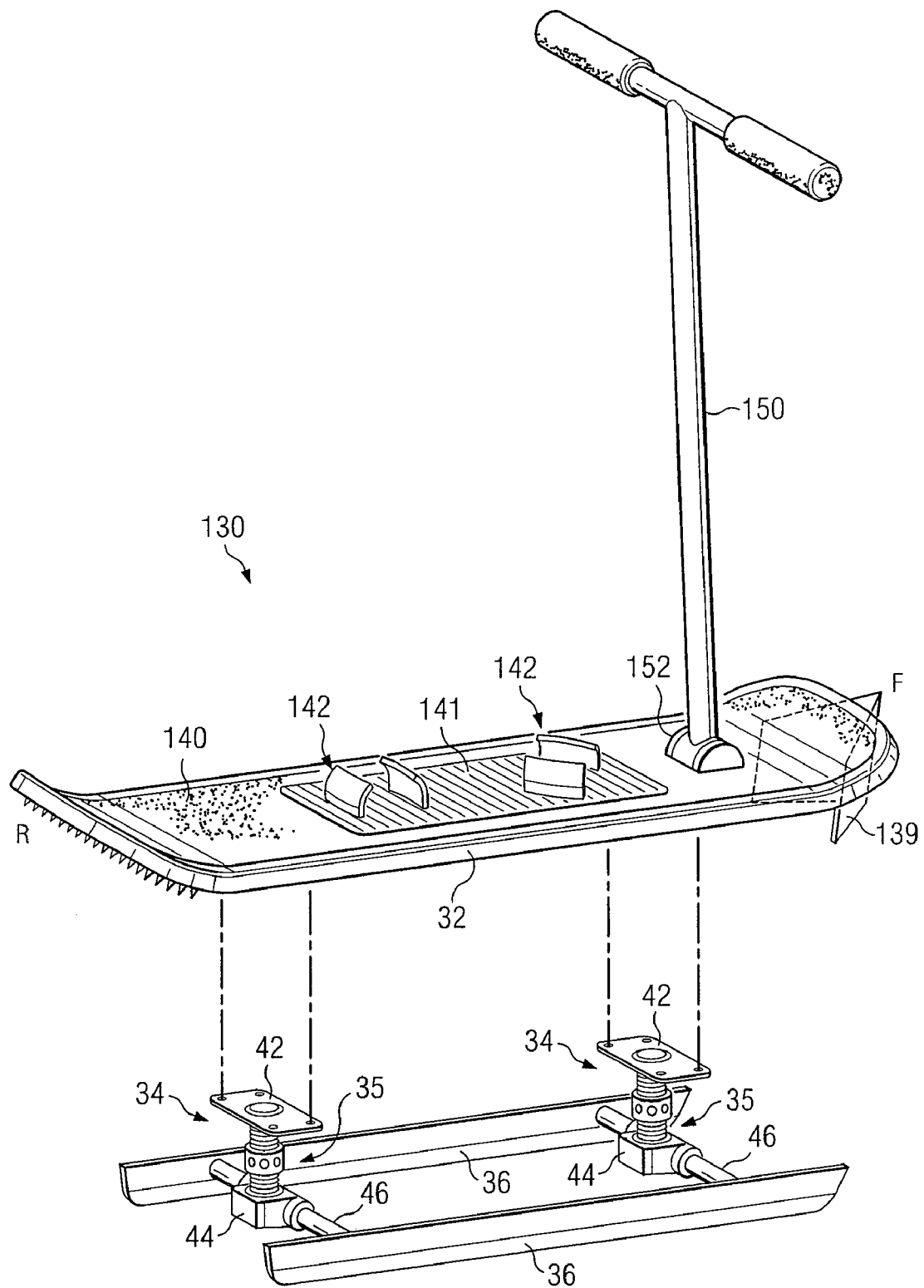
FIG. 3 is an isometric view of an iceboard.

FIG. 3 illustrates an isometric view of an iceboard 130 according to an example embodiment of the present disclosure. Iceboard 130 includes the components illustrated in iceboard 30 as well as a piece of frictional material 140 coupled to the topside of plank 32, a v-shaped plate 139 coupled to the front of plank 32, and a stanchion 150 coupled to the top of plank 32 via a folding mechanism 152.

Frictional material 140 may be any fixture or coating or combination of fixtures or coatings capable of raising the coefficient of friction of plank 32 to provide traction between the soles of a rider's feet and the top of plank 32. In particular embodiments, frictional material 140 may cover all or a portion of the top side of plank 32. As an example and not by way of limitation, frictional material 140 may be composed of a material similar to sandpaper of varying grades and sizes of grit. In particular embodiments, either frictional material 140, plank 32, or both may include a heating element 141. In particular embodiments, heating element 141 may be comprised of a component or components operable to heat a portion or all of iceboard 30 (e.g., to a temperature sufficient to melt frozen water). By heating iceboard 130 to a temperature sufficient to melt frozen water, iceboard 130 may be enabled to melt ice or snow buildup or to otherwise prevent the buildup of ice on, for example, the top surface of iceboard 30. As an example and not by way of limitation, heating element 141 may be powered by a battery or other portable power source coupled to plank 32.

In particular embodiments, iceboard 30 may include a v-shaped plate 139. V-shaped plate 139 may be any mechanical device or fixture or combination of two or more such devices or fixtures capable of allowing iceboard 30 to push through an obstruction. As an example and not by way of limitation, v-shaped plate 139 may comprise two plates that are coupled together at a common edge. Additionally, one or more edges of v-shaped plate 139 may be tapered to align with the top surface of plank 32. In particular embodiments, v-shaped plate 139 may be removably or permanently attached to the front of iceboard 30 thereby allowing iceboard 30 to maneuver through obstructions, such as snow buildup.

In particular embodiments, stanchion 150 may provide additional support for a rider of iceboard 30. In particular embodiments, stanchion 150 may comprise a rigid bar extending vertically from the top of iceboard 130 and may provide a handlebar for a rider of iceboard 30. As an example and not by way of limitation, stanchion 150 may be comprised of aluminum, steel, or other rigid material. In particular embodiments, the length of the stanchion may be telescopically adjustable. Therefore, the handlebar can be set to the appropriate height for different riders. In particular embodiments, stanchion 150 may be collapsible for storage or any suitable purpose. In particular embodiments, stanchion 150 may detach from folding mechanism 152.

In particular embodiments, folding mechanism 152 allows stanchion 150 to be adjusted to different angles. As an example and not by way of limitation, folding mechanism 152 allows the angle of stanchion 150 to be adjusted from a position perpendicular with the top side of plank 32 to a position parallel with the top side of plank 32 or to any position in between. In particular embodiments, folding mechanism 152 may detach from plank 32.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An apparatus, comprising:
    a plank having a first side and a second side and a first end and a second end;
    one or more supports coupled to the first side of the plank;
    one or more blades coupled to the one or more supports, the blades operable to glide across an icy surface;
    a piece of frictional material coupled to the second side of the plank, the frictional material operable to provide traction relative to the plank;
    a brake coupled to the first side of the plank, the brake operable to abrasively scrape the icy surface when applied to the icy surface, wherein the brake comprises a metal sheet, the metal sheet comprising a plurality of pointed protrusions; and a v-shaped plate coupled to the first side of the plank, the v-shaped plate comprising a first flat plate and a second flat plate coupled together along a common edge, the first flat plate and the second flat plate forming an acute angle therebetween, wherein:
    The v-shaped plate is coupled to the second end of the plank such that the common edge is fixed in-line with each of the one or more supports and the acute angle faces the one or more supports; and
    A height of the common edge extends over a majority of a height of the one or more supports such that the v-shaped plate forms a plow for the one or more supports at the second end of the plank.

2. The apparatus of claim 1, wherein the first end of the plank is angled.

3. The apparatus of claim 1, wherein the brake comprises a sheet of frictional material.

4. The apparatus of claim 1, further comprising a second brake coupled to the first side of the plank, wherein:
    the brake is disposed adjacent the first end of the plank;
    the second brake is disposed adjacent the second end of the plank; and
    the second end of the plank is angled.

5. The apparatus of claim 1, wherein the one or more supports comprise an adjustable adjustment mechanism operable to adjust a position of the plank relative to a position of the blades.

6. The apparatus of claim 1, wherein the one or more blades comprise a first curved end and a second curved end.

7. The apparatus of claim 1, further comprising a heating element operable to heat a portion of the plank.

8. The apparatus of claim 7, wherein the heating element is disposed between the plank and the piece of frictional material.

9. The apparatus of claim 7, wherein the piece of frictional material comprises the heating element.

10. The apparatus of claim 1, further comprising a stanchion.

11. The apparatus of claim 10, wherein a first end of the stanchion is coupled to the plank and a second end of the stanchion is coupled to a handlebar.

12. The apparatus of claim 10, wherein the stanchion is coupled to the plank via a folding mechanism operable to adjust the position of the stanchion relative to the plank.

13. The apparatus of claim 10, wherein a length of the stanchion is telescopically adjustable.

14. The apparatus of claim 10, wherein the stanchion is removable from the plank.

15. The apparatus of claim 1, wherein the v-shaped plate is removable from the plank.

16. The apparatus of claim 1, wherein the plank further comprises a clip operable to detachably couple footwear to the plank.

17. An apparatus, comprising:
    a plank having a first side and a second side and a first end and a second end;
    two supports coupled to the first side of the plank;
    two blades coupled to the two supports, the blades operable to glide across an icy surface wherein:
        the supports each comprise an adjustable adjustment mechanism operable to adjust a position of the plank relative to a position of the two blades; and
        each end of the plank comprises an angled portion inclined relative to the blades;
    a piece of frictional material coupled to the second side of the plank, the frictional material operable to provide traction relative to the plank;
    a heating element disposed between the plank and the piece of frictional material, the heating element operable to heat a portion of the plank;
    a first brake coupled to the first side of the plank, the first brake disposed on the angled portion of the first end of the plank and operable to abrasively scrape the icy surface when applied to the icy surface, wherein the first brake comprises a metal sheet, the metal sheet comprising a plurality of pointed protrusions;
    a second brake coupled to the first side of the plank, the second brake disposed on the angled portion of the second end of the plank and operable to abrasively scrape the icy surface when applied to the icy surface, the second brake having a different coefficient of friction from the first brake;
    a telescopically adjustable stanchion coupled to the plank via a folding mechanism, the folding mechanism operable to adjust the position of the stanchion to a plurality of difference angles relative to the plank; and
    a v-shaped plate coupled to the first side of the plank, the v-shaped plate comprising a first flat plate and a second flat plate coupled together another along a common edge, the first flat plate and the second flat plate forming an acute angle therebetween, wherein:
        the v-shaped plate is coupled to the second end of the plank such that the common edge is fixed in-line with each of the one or more supports and the acute angle faces the one or more supports; and
        a height of the common edge extends over a majority of a height of the one or more supports such that the v-shaped plate forms a plow for the one or more supports at the second end of the plank.

18. An apparatus, comprising:

a plank having a first side and a second side and a first end and a second end;

two supports coupled to the first side of the plank;

two blades coupled to the two supports, the blades operable to glide across an icy surface;

a piece of frictional material coupled to the second side of the plank, the frictional material operable to provide traction relative to the plank;

a first brake removably coupled to the first side of the plank, the first brake disposed adjacent the first end of the plank and operable to abrasively scrape the icy surface when applied to the icy surface, wherein the first brake comprises a metal sheet, the metal sheet comprising a plurality of pointed protrusions;

a second brake removably coupled to the first side of the plank, the second brake disposed adjacent the second end of the plank and operable to abrasively scrape the icy surface when applied to the icy surface;

a stanchion removably coupled to the plank; and a v-shaped plate coupled to the first side of the plank, the v-shaped plate comprising a first flat plate and a second flat plate coupled together another along a common edge, the first flat plate and the second flat plate forming an acute angle therebetween, wherein:

the v-shaped plate is coupled to the second end of the plank such that the common edge is fixed in-line with each of the one or more supports and the acute angle faces the one or more supports; and a height of the common edge extends over a majority of a height of the one or more supports such that the v-shaped plate forms a plow for the one or more supports at the second end of the plank.

* * * * *